Aug. 9, 1955 W. L. SIEGERIST 2,714,917
STRIP STRETCHING APPARATUS
Filed May 27, 1954 9 Sheets-Sheet 1
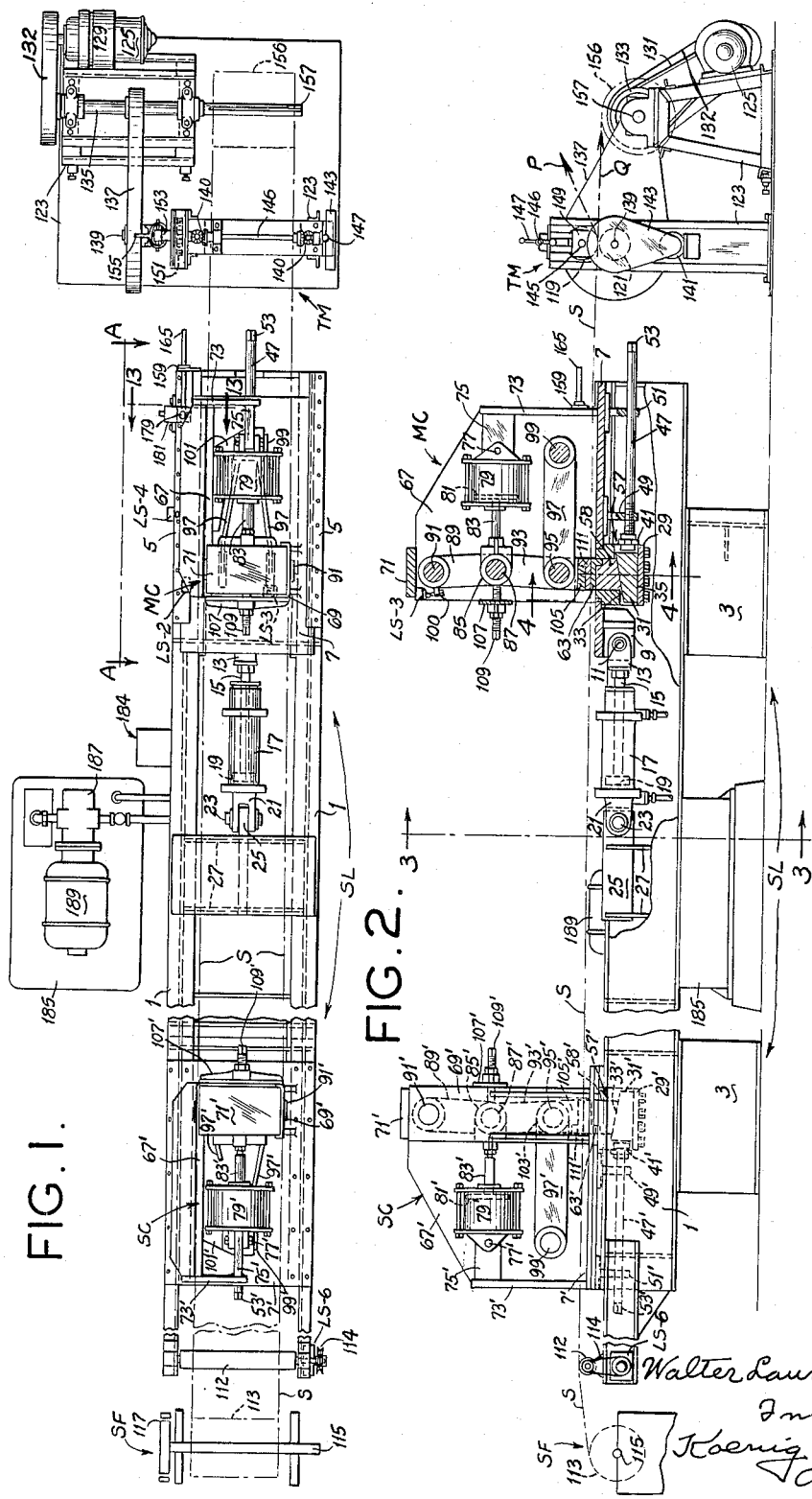

Aug. 9, 1955 W. L. SIEGERIST 2,714,917
STRIP STRETCHING APPARATUS
Filed May 27, 1954 9 Sheets-Sheet 2

Walter Laurenz Siegerist,
Inventor.
Koenig and Pope,
Attorneys.

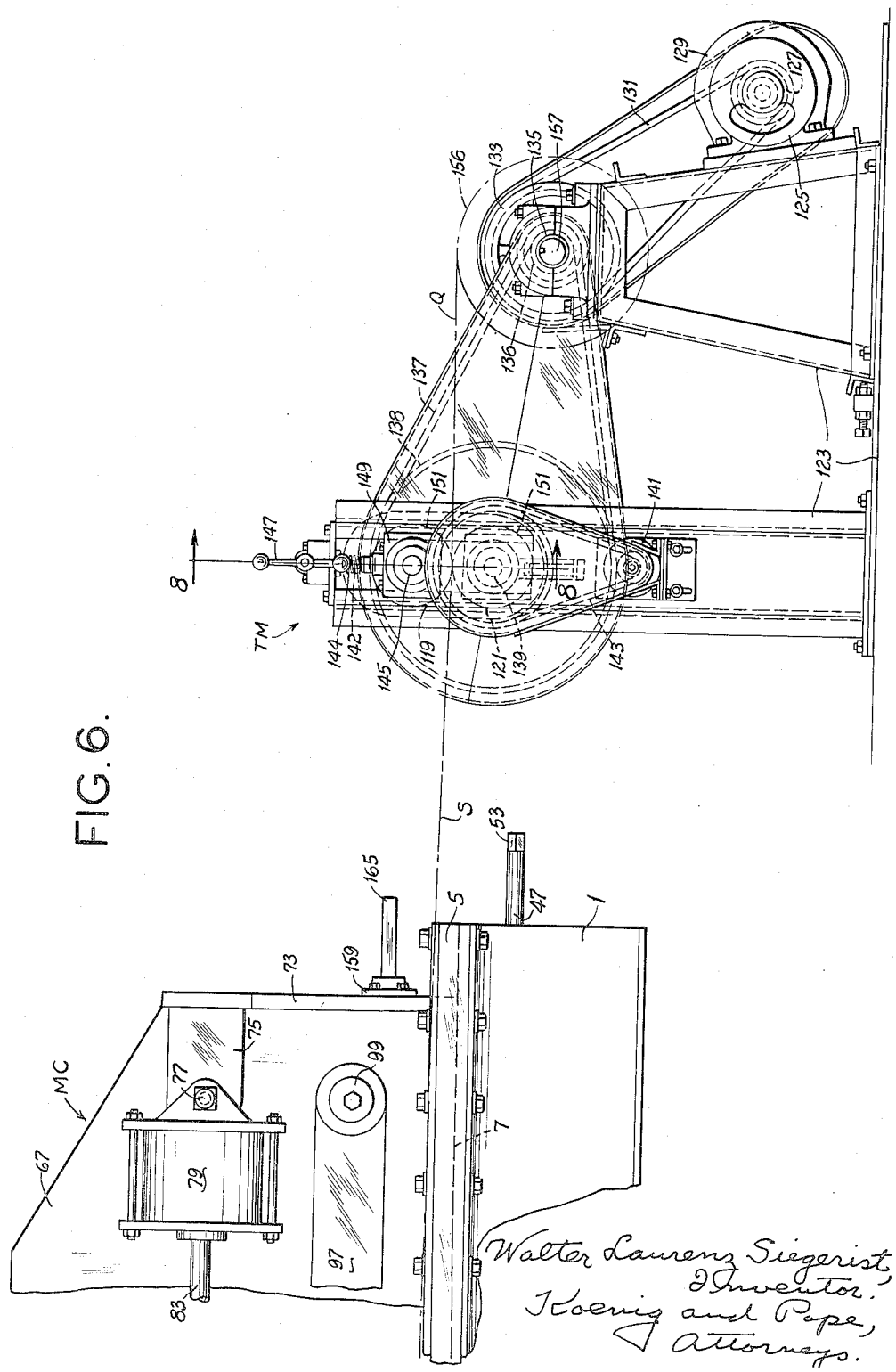

Aug. 9, 1955

W. L. SIEGERIST 2,714,917

STRIP STRETCHING APPARATUS

Filed May 27, 1954

Walter Laurens Siegerist,
Inventor.
Koenig and Pope,
Attorneys.

Aug. 9, 1955

W. L. SIEGERIST 2,714,917

STRIP STRETCHING APPARATUS

Filed May 27, 1954

Walter Laurenz Siegerist,
Inventor.
Koenig and Pope,
Attorneys.

Aug. 9, 1955  W. L. SIEGERIST  2,714,917
STRIP STRETCHING APPARATUS
Filed May 27, 1954  9 Sheets-Sheet 7

Walter Laurenz Siegerist,
Inventor
Loenig and Pope,
Attorneys.

Aug. 9, 1955 W. L. SIEGERIST 2,714,917
STRIP STRETCHING APPARATUS
Filed May 27, 1954 9 Sheets-Sheet 8

Aug. 9, 1955 W. L. SIEGERIST 2,714,917
STRIP STRETCHING APPARATUS
Filed May 27, 1954 9 Sheets-Sheet 9

United States Patent Office
2,714,917
Patented Aug. 9, 1955

2,714,917

STRIP STRETCHING APPARATUS

Walter Laurenz Siegerist, Affton, Mo., assignor, by mesne assignments, to Continental Foundry & Machine Company, East Chicago, Ind., a corporation of Delaware Application May 27, 1954, Serial No. 432,811

11 Claims. (Cl. 153—35)

This invention relates to strip stretching apparatus in general, and with regard to certain more specific features to automatically controlled apparatus for stretching and straightening metal strips.

Objects

Among the several objects of the invention may be noted the provision of strip stretching apparatus adapted automatically to stretch metal strip material in order to straighten it, remove camber and evenly workharden it; the provision of stretching apparatus adapted automatically to stretch successive lengths of a wide variety of single and multiple strips a predetermined amount; the provision of a stretcher of the class described which performs strip feeding and stretching operations with minimum applied shock and minimum marring of the surfaces of the strip; the provision of apparatus of the class described which is adapted to coil the stretched strip or, alternatively and without coiling, to pass said strip to a subsequent operation; and the provision of strip stretching apparatus in which formation of slack in the stretched strip material is prevented and the stretched strip material is rapidly removed simultaneously with the introduction of a fresh length of strip. Other objects and features will be in part apparent and in part pointed out hereinafter.

The invention accordingly comprises the constructions hereinafter described, the scope of the invention being indicated in the following claims.

Drawings

In the accompanying drawings, in which several of various possible embodiments of the invention are illustrated, Fig. 1 is a plan view of basic mechanical apparatus embodying the invention;

Fig. 2 is a front elevation of Fig. 1, parts being shown in section;

Fig. 6 is an enlarged detail elevation of the right-end portions of Fig. 2, showing a take-off mechanism;

Corresponding reference characters indicate corresponding parts throughout the several views of the drawings.

Mechanical arrangements (Figs. 1–13)

Figure 5:
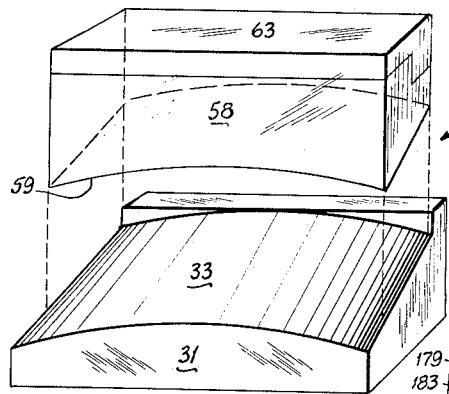
Fig. 5 is a trimetric view illustrating certain details of the construction shown in Fig. 4.
Figure 3:
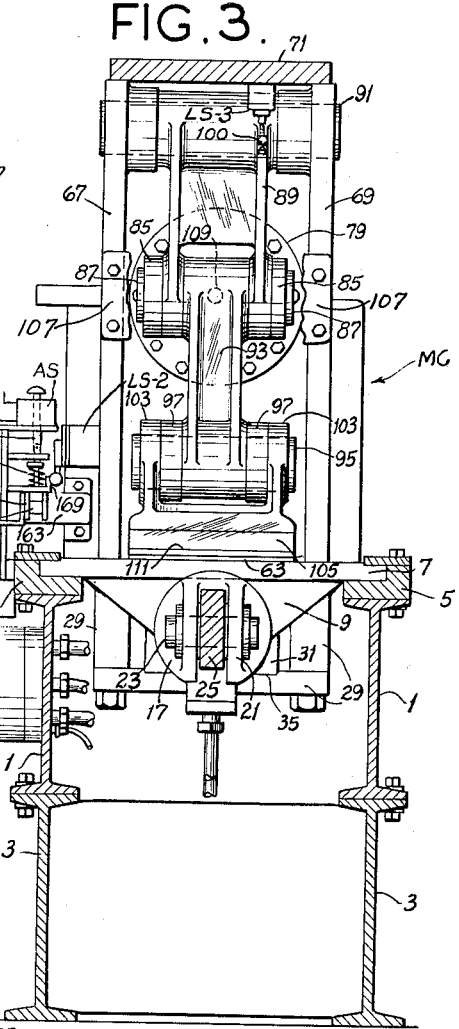
Fig 3 is an enlarged vertical section taken on line 3—3 of Fig. 2.
Figure 4:
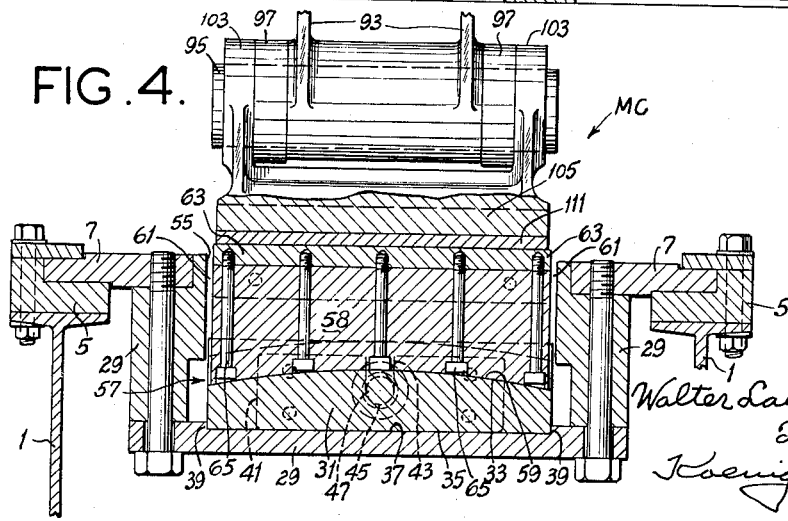
Fig. 4 is an enlarged vertical section taken on line 4—4 of Fig. 2.
Figure 7:
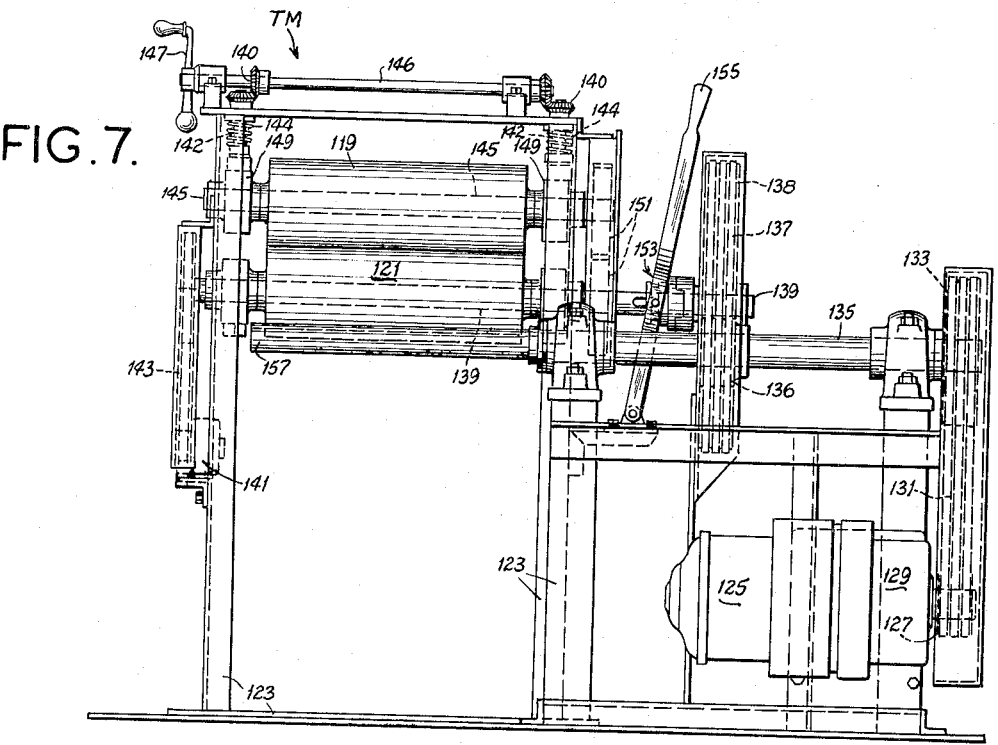
Fig 7 is a left-end view of the take-off mechanism shown in Fig. 6.

The strip stretching apparatus of the present invention includes three principal physical assemblies. The first is a strip feeding mechanism as shown generally at SF which serves to supply strip material S to the apparatus. The second assembly (indicated by reference character SL) is constituted generally by an elongate bed, an input section including a first openable clamp SC fixed at the one end of the bed adjacent mechanism SF, and an output section at the other end of the bed including a second openable clamp MC movable toward and away from clamp SC. This second assembly SL is adapted to grip the ends of a portion of strip material S between the jaws of clamps MC and SC, to stretch this portion of strip a predetermined amount and then release the resulting length of stretched strip preparatory to a subsequent cycle of operation on another portion of unstretched strip material. The third principal physical assembly is a take-off mechanism TM mounted adjacent the output section. This assembly handles the stretched strip both during and after a strip stretching operation. The following is a more detailed description of the structural components constituting these three assemblies and their interrelationship.

Referring now more particularly to Figs. 1–5, there is shown at numeral 1 an elongate bed carried upon supports 3. At the right end of this bed, or output section, are guides 5 for a sliding carriage 7. On the front end of the carriage is affixed a depending web 9 having a pin connection 11 with a clevis 13 on the end of a piston rod 15. The latter extends into a hydraulic cylinder 17 within which is a double-acting piston 19 for the purpose of reciprocating the carriage. The cylinder 17 carries a clevis 21 having a pin connection 23 with a web plate 25 attached to the bed 1 by braces 27.

The carriage 7 is formed with a side wall 67 and a pillar 69 provided with a top cross brace 71. Extending from the wall 67 is an end wall 73, carrying a web plate 75 having a pin connection 77 with an air cylinder 79 in which is a double-acting piston 81. A piston rod is shown at 83, carrying a clevis 85 connected to a knee pin 87 of a toggle linkage. This linkage is constituted by an upper toggle link 89, pinned at 91 between members 67 and 69; also a lower toggle link 93 held by the knee pin 87. At its lower end, link 93 is joined by a pin 95 to an A-shaped rocker 97. The rocker is pinned at 99 to an anchor web 101, attached to the wall 67. The pin 95 passes through a clevis 103 of an upper clamp jaw 105. The front edge portion of wall 67 and pillar 69 support, and have bolted thereto, a cross brace 107, the cross brace carrying an adjusting limit stop screw 109 for limiting the action of the toggle linkage 89, 93 to short of dead center. The upper jaw 105 has a wear surface 111 for cooperation with a material-engaging member 63 of a lower clamp 57.

Lower or compensating clamp jaw 57 is also carried by carriage 7. This jaw comprises a stirrup 29, depending from the carriage 7, which supports a wedge block 31 having a laterally rounded and axially sloping wedge surface 33. Above the wedge block 31 the stirrup 29 is provided with an opening 55 which acts as a vertical guide for a lower clamp block 58. This clamp block 58 has a bottom surface 59 which is cooperatively complementary to the upper surface 33 of the wedge 31, so that the clamp block 58 may rock laterally, clearance 61 in the opening 55 being provided for the purpose. Attached to the upper side of the clamp block 58 is the material-engaging face member 63, held in place by studs 65. By adjusting wedge 31 axially, the face of member 63 may be placed just under the plane of material S to be stretched. Surfaces 33 and 59 compensate for lateral variations, as will appear. These surfaces are not conical but are of similar concave and convex trough shapes determined by parallel, sloping straight-line generators. These lie parallel to a line which slopes relative to the plane of any strip between the jaws and lie in a plane perpendicular to the plane of the strip but parallel to its length. It will be observed that jaw 105 is pivoted on an axis crosswise of the strip. Thus a dual compensation for parallelism between the jaw faces is effected by the ability of jaw 105 to rock on the axis of pin 95 and the ability of jaw 57 to rock on an axis perpendicular to the axis of pin 95. The bottom 35 of the block 31 rests upon the upper surface 37 of the stirrup, being guided in longitudinal movement by shoulders 39. On the back of the wedge block 31 is a stirrup 41, slotted as shown at 43 to receive the grooved head 45 of an adjusting screw 47. The screw is threaded through a bracket 49 attached to the bottom of the carriage 7. Otherwise the screw 47 is unthreaded, and is freely movable through an unthreaded opening in a second bracket 51 attached at the bottom of the carriage 7. At its outer end is a polygonal head 53 for receiving a rotatable adjusting tool. Upon rotation of the screw 47, the wedge block 31 may be adjusted longitudinally in the stirrup 29.

At the other, or input section, end of the bed 1 is a structure similar to that of the carriage 7 already described, except that it is not slidable in the bed 1 but is affixed thereto. It is indexed with the index 7' to suggest its similarity to the carriage 7. All parts on the structure 7' which are of the same form and function as those on the carriage 7 are provided with the same reference characters except that they are primed.

In view of the above, it will be seen that the input section includes the parts on the left end (structure 7') of the bed 1 which constitute the stationary toggle clamp SC. The output section includes the parts on the right end (movable carriage 7) of bed 1 which constitute movable clamp MC. As stated above, the movable clamp MC may be reciprocated on the bed 1 by means of the double-acting hydraulic cylinder 17, while the stationary clamp SC is anchored to the bed.

Strip material S to be stretched is supplied from a coil 113 of the material, carried on a coil support or arbor 115 located adjacent the input section of the stretcher. A suitable brake 117 provides a constant drag or frictional resistance to prevent uncoiling by overrun. It will be understood that the material S may be constituted by a single strip of width and thickness within the capacity of the stretcher, or by several parallel strips supplied from tandem coils at 113. Hereinafter a single strip will be referred to, but it will be understood that tandem strips are included. It will also be understood that long lengths of uncoiled material as well as coiled strip may be used as feed material herein.

At 112 is a guide roller over which the strip S passes. The roller is turned by the strip as it moves. The roller is connected by a drive 114 with an intermittently actuated monitoring switch device LS–6 of any suitable type for effecting repeated momentary switch closure in response to successive lengths of material fed into the stretcher, say, for example, 40-foot lengths.

The strip S is threaded between the open jaw clamps 57' and 105' of the stationary clamp SC. It is also threaded between the open jaw clamps 57 and 105 of the movable clamp MC. Its end is finally threaded between upper and lower rolls 119 and 121 of take-off mechanism TM.

It will be understood that the rocking form of lower jaw clamp 57, or 57' as the case may be (such as shown in Fig. 5), is important, in that it compensates for irregularities in the bottom surface of the upper jaw clamp 105 or 105', as the case may be, and for variations in material thicknesses. Therefore the clamping pressure applied to the material S is evenly applied, avoiding gouging, nicking, etc. of the material being clamped.

Each cycle of operation of the stretching apparatus of the present invention comprises four steps. The first step is designated as Clamp, wherein a predetermined length or reach of material S between clamps MC and SC is simultaneously gripped by the jaws of these clamps. The length of successive portions of material is determined by the spacing between clamps SC and MC, for example 40 feet. This clamping is effected simultaneously by application of air pressure to cylinders 79 and 79' which moves the piston rods 83 and 83' so as to straighten out the toggle linkages 89, 93 and 89', 93'. This closes the jaw clamps 57, 105 and 57', 105' at spaced intervals (say 40 feet apart) on the material S. This is caused to occur when the clamps SC and MC are closest together, i. e., when the hydraulic piston 19 is retracted in cylinder 17. The material S at this time is substantially stationary, for reasons which will appear. During the second or Stretch step, the movable clamp MC is driven to the right (Fig. 2) in order, first, to take slack out of the reach of material S between the clamps and, second, to stretch it past its elastic limit a predetermined amount. Any slack thus introduced into the material moving to the take-off mechanism TM is taken up by the latter as will be described hereinafter. The third step, Unclamp, is the opposite of the first step and during this step the jaws of clamps MC and SC are simultaneously opened by retracting rods 83 and 83', thus releasing the stretched portion of material S. This is followed by the last step, designated Return, during which movable clamp MC is retracted to its initial position on bed 1 by action of hydraulic cylinder 17. Each of these steps may be initiated separately and in response to manual actuation by an operator or they may be initiated automatically in sequence without the necessity of manual actuation by an operator between successive steps. Also, successive operational cycles can be initiated automatically or manually as desired.

In Figs. 9–12 is shown an arrangement on the clamp MC for determining, in the Stretch step, the slack take-up and how much each length of strip material S will be stretched. Figs. 9–12 are rear views of the clamp MC as seen in Figs. 1 and 2 on line A—A. In Figs. 1 and 2 clamp MC moves to the right during the Stretch step. In Figs. 9–12 the movements of clamp MC relative to the bed 1 will be toward the left during the slack take-up and stretching portions of the Stretch step.

The clamp MC carries on wall 67 a group of bearing brackets 159, 161, 163 (Figs. 9–12). Slidably supported in these brackets is an integrating bar 165, having on it a head stop 167 limiting its leftward movement relative to the movable clamp MC. Adjustably clamped to the bar 165 is a trip member 169. A spring 171, reacting between the trip member 169 and bracket 163, biases the bar 165 to the left. Indexing marks 173 on the bar 165 provide a calibrated scale so that trip member 169 may be positioned selectively.

Figure 13:
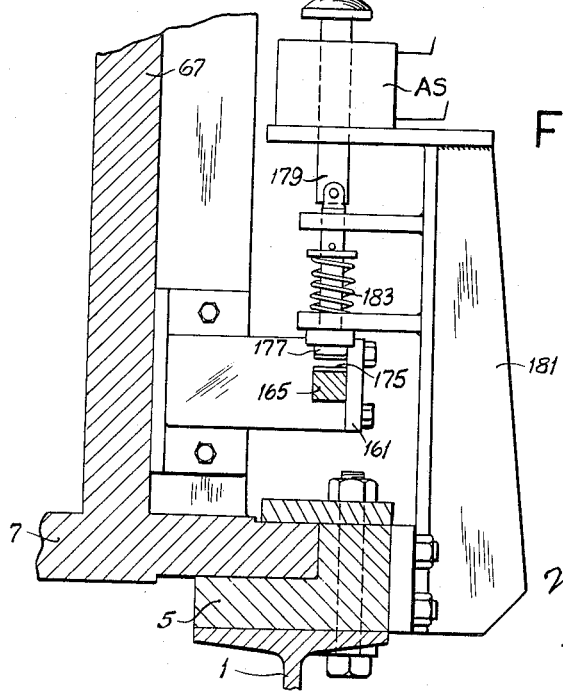
Fig. 13 is an enlarged detail cross section taken on lines 13—13 of Figs. 1 and 9.
Figure 8:
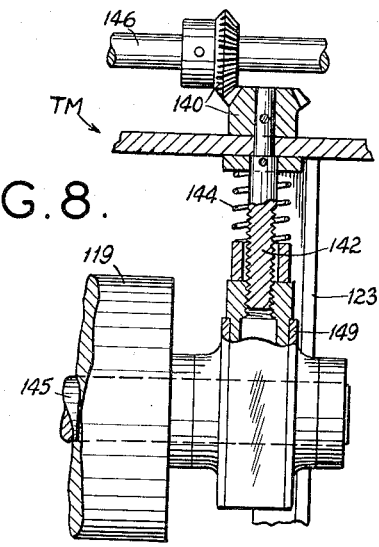
Fig. 8 is an enlarged vertical detail cross section taken on line 8—8 of Fig. 6.

The bar 165 also carries serrated teeth 175. These are adapted to be engaged by a toothed stop 177. This stop is carried on a vertically movable solenoid-operated armature 179 which is slidable in a bracket 181 attached to the bed 1. A solenoid control coil for the armature 179 is indicated at AS. When the solenoid is excited, the toothed stop 177 is driven down into holding engagement with the teeth of bar 165. When deexcited, the armature 179 is biased to a raised disengaged position by a spring 183 (Fig. 13). At LS–2 is shown a limit switch affixed to the wall 67 and therefore movable with the movable clamp MC as a whole. This switch is actuated when it engages the trip 169. At LS–4 is shown a limit switch attached to the bed 1. This is operated by an extension 162 from the bearing bracket 161.

Figure 9:
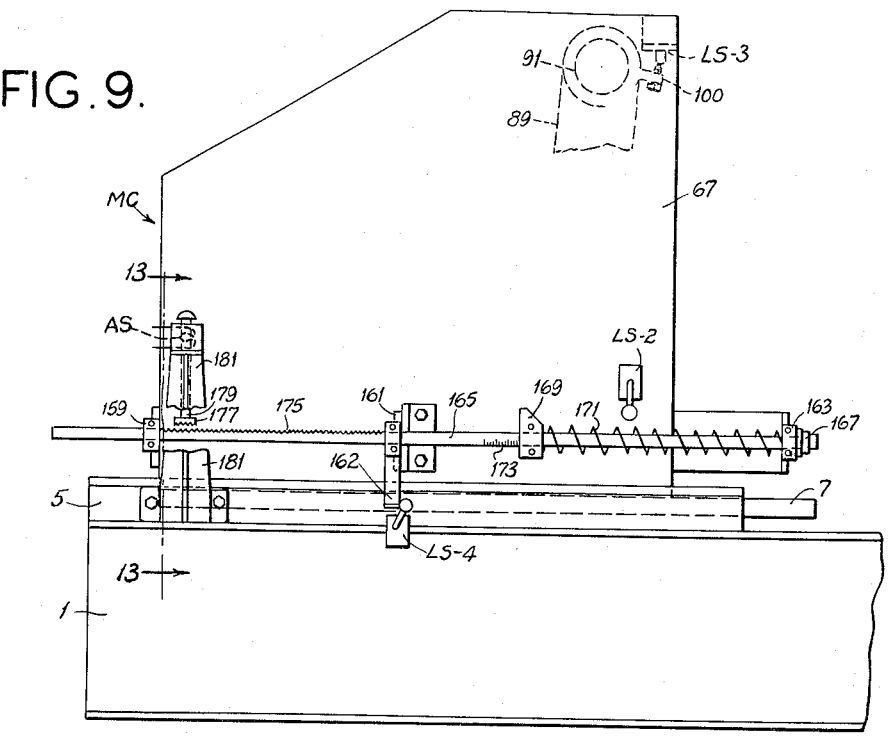
Figs. 9–12 are fragmentary side elevations, viewed generally from line A—A of Fig. 1, showing various details omitted from Fig. 1 for clarity, and illustrating a certain operational sequence.

The mechanical operating sequence of the movable clamp MC is illustrated in Figs. 9–12. In Fig. 9 the entire assembly MC is forward and to the right (in Figs. 1 and 2 this would be to the left). Assuming that the clamps 57, 105 and 57', 105' are now closed upon the material S (Clamp), and liquid is applied (Stretch) behind the piston 19 in cylinder 17, the movable clamp MC will be driven to the left (compare Figs. 9 and 10). Stop 177 is in raised, released position. No relative movement occurs between the bar 165 in its bearings 159, 161, 163. Therefore, no relative movement occurs between the trip 169 and the limit switch LS–2. On the other hand, extension 162 moves away from limit switch LS–4.

Figure 10:
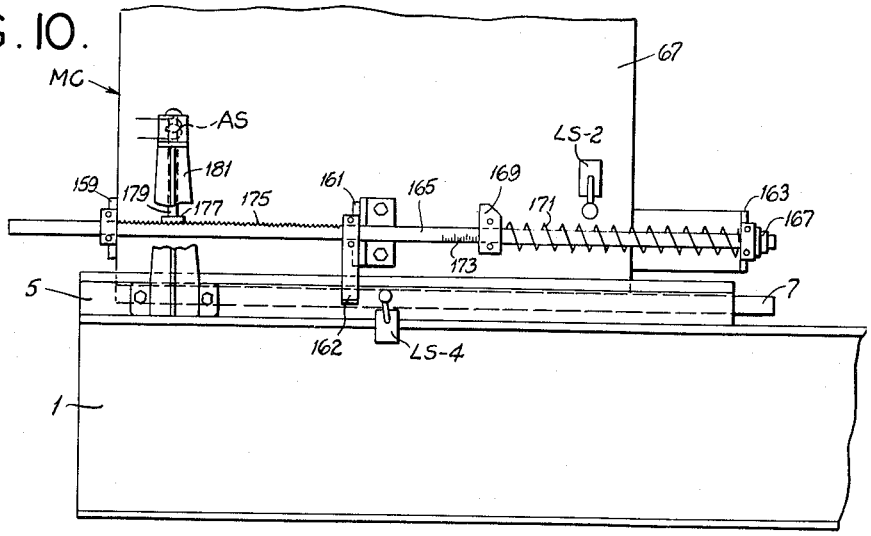
Figure 11:
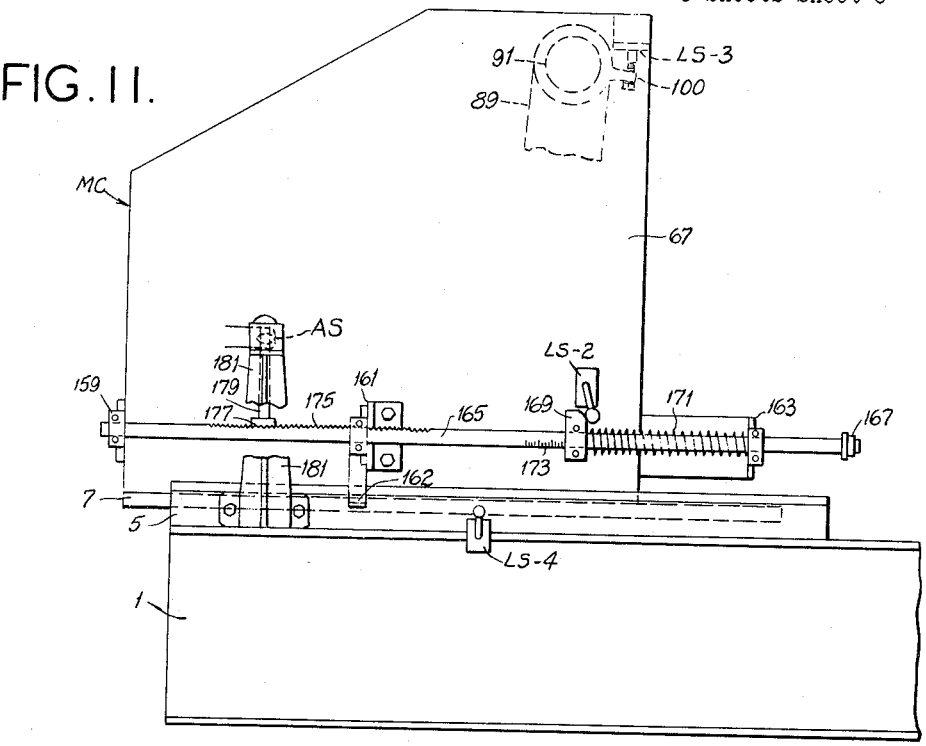
Figure 12:
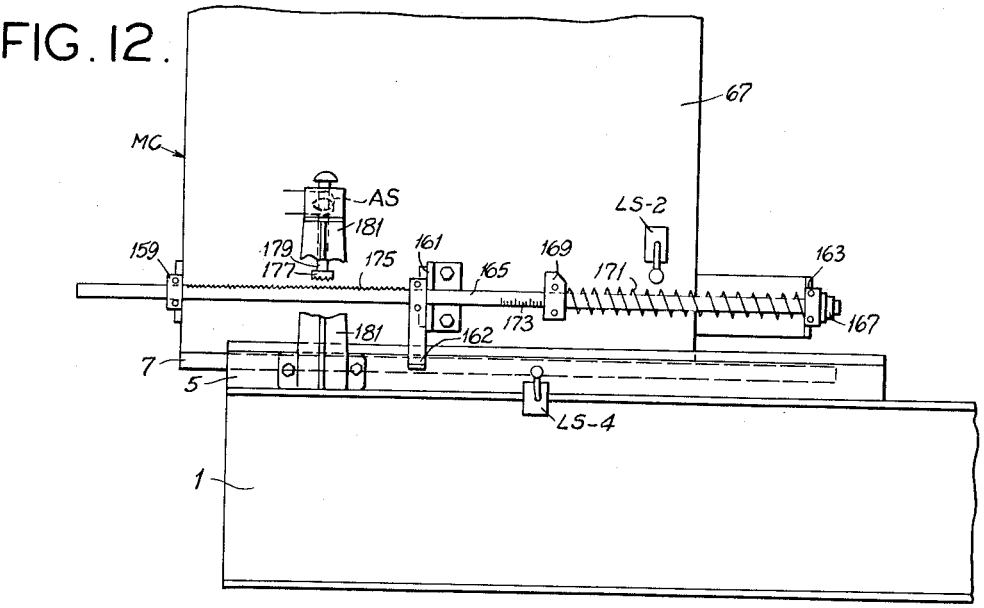

When the clamp MC reaches the Fig. 10 position, slack has been taken out of the reach of material S between SC and MC. At this time the solenoid AS is excited to drive the stop 177 into holding position against bar 165. Then upon further movement to the left of the clamp MC (compare Figs. 10 and 11), the bar 165 is held, while the limit switch LS–2 advances upon the trip 169 until it engages the latter to be tripped. Actuation of switch LS–2 concludes the Stretch step and initiates the Unclamp step whereby the jaws of clamps MC and SC are caused to be opened by admitting air to cylinders 79, 79'. Also, during this Unclamp step the solenoid AS is deexcited, which releases the bar 165 for return to its original position relative to the clamp MC (Fig. 12). Spring 171 accomplishes this return action of the bar 165.

In order to insure that the jaws 57, 105 and jaws 57', 105' have opened a sufficient distance (e. g., ¾ inch to an inch) so that the strip S can be moved rapidly through them without essential damage, limit switch LS–3 is provided on wall 67 of the movable clamp MC. This switch is actuated by a lug 100 on the link 89 and, as will be shown below, delays rapid movement of material S by the take-off mechanism TM until the clamp jaws are sufficiently widely open. Actuation of this limit switch LS–3 initiates the last, or Return, step. During this step liquid is released from behind piston 19 while liquid under pressure ahead of it drives it back to its original position. This returns the movable clamp MC from the Fig. 12 position to the Fig. 9 or the initial position. The returning action continues until the extension 162 engages limit switch LS–4, which, when actuated, concludes the Return step and one complete cycle of operation. The clamp MC is then in a position to be reclosed upon a subsequent length of the material S, which has in the meantime been drawn into the machine at a rapid rate of the take-off mechanism TM.

The take-off mechanism TM is constituted by a stationary framework 123 (Figs. 1, 2 and 6–8) and is located adjacent the output section of bed 1. On the rear of this framework is mounted a constant-speed motor 125 which drives a sheave 127 through a variable-speed electric slip coupling 129. The speed of sheave 127 and the amount of torque it can deliver are determined by coupling 129 as will be described hereinafter. A multiple V-belt drive 131 connects the sheave 127 with a sheave 133 on a countershaft 135, having a rotary mandrel extension 157. A safety shield 132 surrounds the drive 131. A belt drive 137 connects a sheave 136 on the countershaft 135 with a sheave 138 which normally freely rotates on a shaft 139 carrying the roll 121. The sheave 138 is adapted to be clutched and declutched from shaft 139 by a crown clutch 153, manually operable from a clutch lever 155. The center line of shaft 139 is fixed. An A. C. generator 141 is mounted on the frame 123 and driven from the shaft 139 by a belt drive 143. This is for control purposes, as will appear.

Roll 119 is carried on a shaft 145, the center line of which is vertically adjustable from a hand-controlled elevator mechanism operative upon the bearings 149 of shaft 145. The hand control is indicated at 147 for a cross shaft 146 operative through bevel gear sets 140 upon control screws 142 in the bearing blocks 149. Springs 144 remove lash from the fairly loose screw connections between 140 and 149 and compensate for small variations in the thickness of materials passing between rolls 119 and 121. The shafts 139 and 145 are connected by gears 151, the teeth of which are preferably of long addendum, involute forms adapted to operate at variable center distances.

The take-off mechanism TM, as stated above, serves to handle the stretched strip material both during and after a strip stretching operation. It applies, alternatively, either of two predetermined preselected pulling forces to the strip in the stretching direction away from the movable clamp (to the right to Figs. 1 and 2). An increased pulling force is applied as soon as the clamp jaws are sufficiently wide open so that the reach of the stretched material S is rapidly removed from between these jaws. As soon as the following cycle of operation is started by initiating the Clamp step, a decreased pulling force is applied to the strip material S. This decreased pulling force continues to apply a small amount of tension to the portion of strip S between the output section and the take-off mechanism during the Clamp, Stretch and Unclamp steps so that any formation of slack in this portion of stretched strip is continually prevented.

As will be described in additional detail hereinafter, take-off mechanism TM may be operated to form a coil 156 of the strip material S around mandrel 157 (path Q of Fig. 2) or alternatively to pass strip S (path P of Fig. 2) to a subsequent process.

*Pneumatic and hydraulic arrangements (Fig. 14)*

Figure 14:
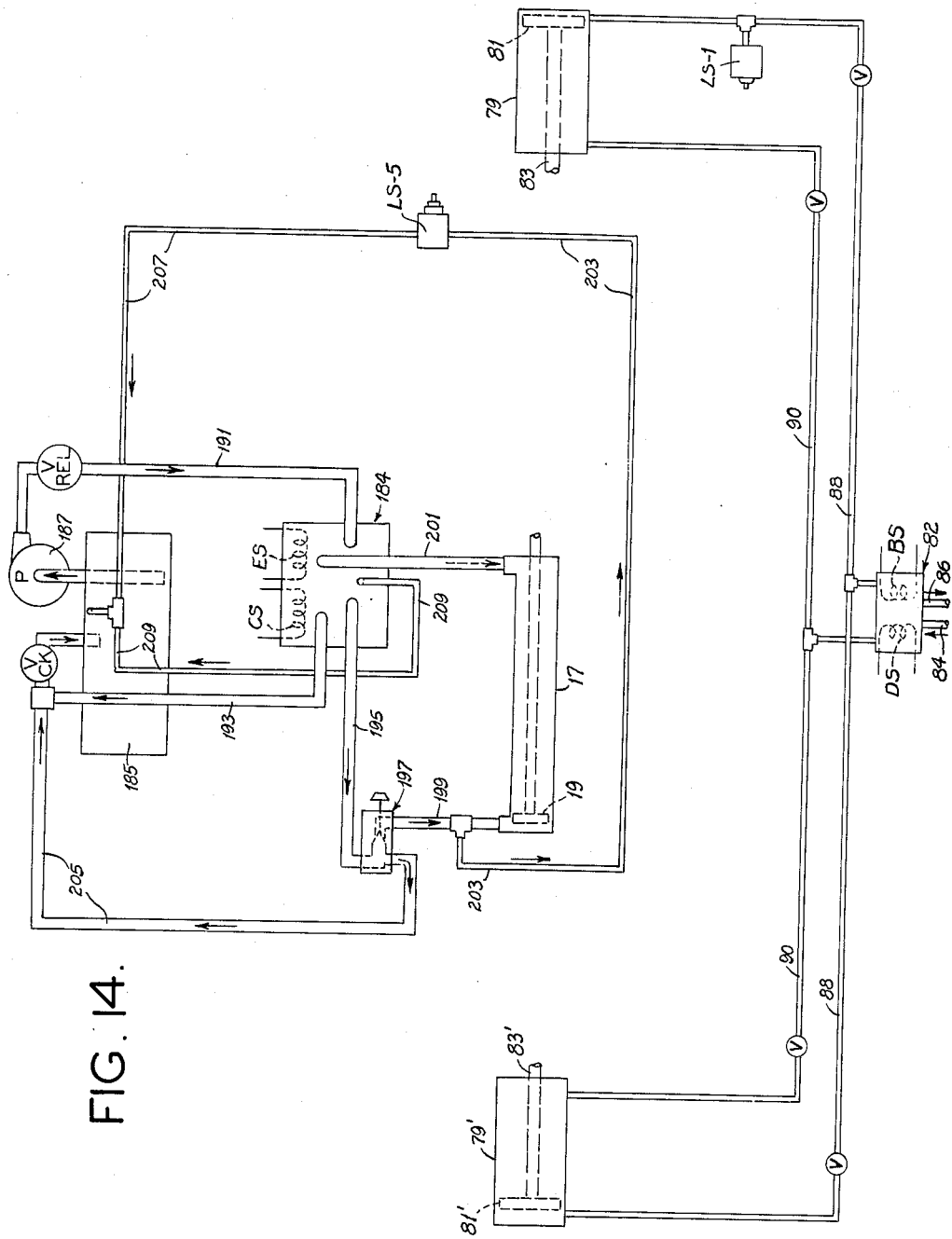
Fig. 14 is a schematic hydraulic-pneumatic circuit.
Figure 15:
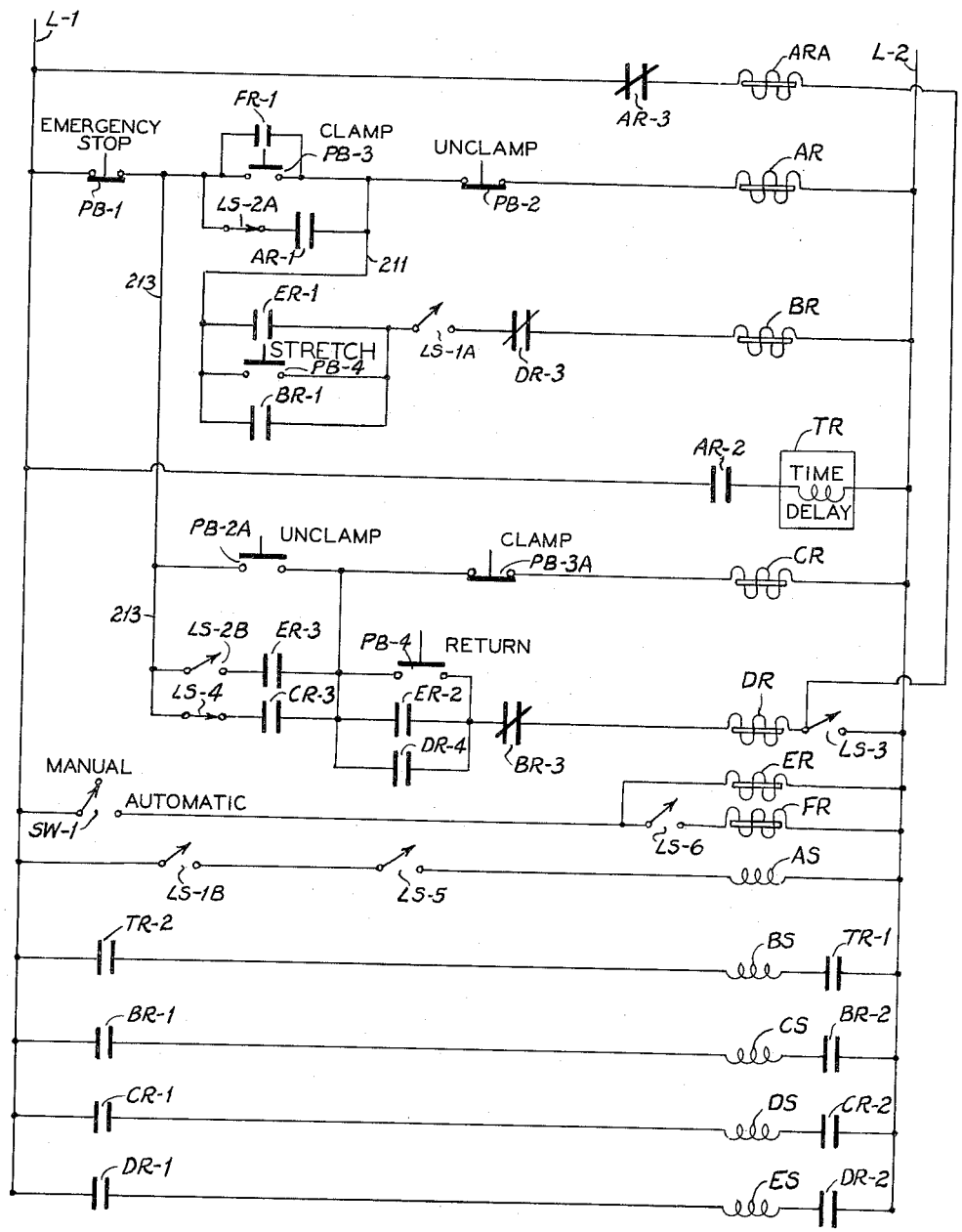
Figs. 15 and 16 are schematic wiring diagrams of various interconnected switches, solenoids and control components associated with the apparatus.

The double-acting pistons 81 and 81' of the air cylinders 79 and 79' which actuate clamp jaws 105 and 105' are energized by means of the pneumatic circuit shown schematically in the lower portion of Fig. 14. A double solenoid pneumatic air valve 82, connected to a source of compressed air as indicated at 84, includes two solenoid coils BS and DS and an exhaust 86. Valve 82 may be of any of the customary commercial types and preferably is self-maintaining, i. e., it will remain in the position to which it was last energized until the other solenoid coil is energized. Valve 82 interconnects compressed-air source 84 to a line 88 when solenoid coil BS is electrically energized. When solenoid coil DS is electrically energized, a line 90 is connected to source 84. In the former instance, it will be noted that piston rods 83 and 83' will be simultaneously moved toward each other to act on the toggle linkages and thereby cause clamps SC and MC to close. Exhaust line 86 at this time provides a vent so the air on the opposite sides of pistons 81 and 81' may be exhausted via line 90. Clamps SC and MC are actuated to an open or unclamped position upon electrical energization of DS, valve 82 thereupon connecting line 88 to exhaust 86. A pressure-sensitive switch LS–1 is connected in air line 88 and is responsive to a predetermined air pressure to actuate a set of contacts LS–1A and LS–1B (Fig. 15). This predetermined air pressure corresponds to a value sufficient to maintain the two sets of clamp jaws in firm gripping engagement with strip S.

The double-acting piston 19 of hydraulic cylinder 17 is energized by means of the hydraulic circuit illustrated schematically in the upper portion of Fig. 14. A double solenoid hydraulic valve 184 interconnects a sump or supply compartment 185 and a pump 187 with cylinder 17. A motor 189 (Figs. 1 and 2) drives pump 187 to supply hydraulic fluid under pressure via line 191 to valve 184. Valve 184 may be of any commercial type which is spring centered in a neutral position (i. e., permits the hydraulic fluid to be circulated back to sump 185 via a return line 193) when neither of a pair of solenoid coils CS and ES is electrically energized. Whenever solenoid coil CS is energized, hydraulic liquid under pressure from line 191 is connected by valve 184 through a line 195, an adjustable orifice or flow control 197, and a line 199 to one port of hydraulic cylinder 17. This action causes piston 19 to move to the right, thus moving movable clamp MC away from clamp SC to stretch strip S. Fluid on the other side of piston 19 is exhausted to sump 185 via line 201, valve 184 and return line 193. A limit switch LS–5 is connected by a hydraulic signal line 203 to line 199. Switch LS–5 (indicated schematically in Fig. 15) is responsive to a predetermined value of hydraulic pressure acting on the left end of piston 19. This predetermined hydraulic pressure corresponds to a value sufficient to exert a stretching force great enough to remove the slack from the portion of strip S between clamps MC and SC, but without exceeding the elastic limit of material S.

Clamp MC is returned to its original position by electrically energizing solenoid ES, which acts to direct fluid under pressure through the line 201 (in the direction of the dashed arrow) and against the right side of piston 19. Fluid on the left side of piston 19 is returned to the sump via a line 205 as piston 19 is caused to move to its initial position. Tubes 207 and 209 interconnect switch LS–5 and valve 184, respectively, to sump 185 and function as drain lines. A check valve and a relief valve are connected in the hydraulic circuit as noted.

*Electrical arrangements (Figs. 15 and 16)*

The physical locations and the mechanical, pneumatic and/or hydraulic connections to the five limit switches (indexed LS–1 through LS–5) and the five solenoid coils (indexed AS through ES) have been described above. The electrical interconnection of these switches and solenoid coils, together with various control relays, switches and elements, is illustrated schematically in Figs. 15 and 16.

Referring now more particularly to Fig. 15, a source of electrical power is indicated at L–1, L–2. A series of control relays indexed ARA, AR, BR, TR, CR, DR, ER and FR is shown connected across L–1 and L–2 in a number of parallel circuits, each of which includes one or more sets of electrical contacts and switches. The first of such circuits includes, series-connected, the coil of relay AR, two normally closed push button switches PB–1 and PB–2 (Emergency stop and Unclamp, respectively) and a third normally open push button switch PB–3 (Clamp). A pair of contacts FR–1 of relay FR is shunt-connected across switch PB–3. Also connected in shunt with this switch is a holding circuit including one set of normally closed contacts LS–2A of limit switch LS–2 series-connected with a set of contacts AR–1 of relay AR. This parallel circuit functions to initiate the action of time-delay relay TR (and this the Clamp step) and deenergize the parallel circuit including relay ARA.

A second circuit across L–1, L–2 includes a coil of relay BR, series-connected with a normally open set of contacts LS–1A of limit switch LS–1, a normally closed set of contacts DR–3 and a normally open push button switch PB–4. A normally open set of contacts ER–1 of relay ER and a set of normally open contacts BR–1 (connected as holding circuits across switch PB–4) are each shunt-connected across PB–4. A wire 211 interconnects contacts ER–1 to switch PB–3 through which the electrical circuit to L–1 may be completed. This parallel circuit functions to initiate the Stretch step.

The third circuit connected across L–1, L–2 includes the coil of relay TR series-connected with contacts AR–2 of relay AR. Relay TR provides a predetermined time delay between the instant it is energized (by closure of contacts AR–2) and the instant it operates to close its contacts TR–1 and TR–2.

The fourth circuit connected across L–1, L–2 includes a normally open push button switch PB–2A (Unclamp) and a normally closed switch PB–3A (Clamp) series-connected with relay CR. A wire 213 interconnects switch PB–2A to L–1 via switch PB–1. Switch PB–2A is shunted by two separate series circuits; the first being made up of a second set of switch contacts LS–2B of switch LS–2 and a third set of contacts ER–3 of relay ER; the second being made up of switch LS–4 and a third set of contacts CR–3 of relay CR.

The fifth control circuit, connected across L–1, L–2, includes relay DR, limit switch LS–3, a third set of contacts BR–3 of relay BR and a normally open push button switch PB–4. The connection between L–1 and this circuit is made through switch PB–1, wire 213 and switch PB–2A (or either of the two shunt paths provided around PB–2A). Another set of contacts DR–4 of relay DR is connected in parallel with PB–4 to provide a holding circuit. Switch PB–4 is also shunted by a second set of contacts ER–2 of relay ER.

Relay ARA, normally open relay contacts AR–3 and switch LS–3 make up the sixth control circuit connected across L–1 and L–2. The seventh such circuit includes relay ER and manual-automatic switch SW–1. The last control relay circuit includes relay FR, switch device LS–6 and switch SW–1.

Each of the above eight circuits functions in cooperation with the others to initiate, time and conclude various operational steps, sequences of steps and cycles of operation, either manually or automatically, and to provide certain interlock relationships which will be explained below. The control exercised by these relay control circuits is accomplished by means of solenoid coils BS through ES inclusive. Each of these four solenoid coils is energized upon control relays TR, BR, CR and DR, respectively, being energized. As described above, the energization of coil BS or DS causes gripping or releasing action, respectively, of clamps MC and SC. Similarly, energization of either CS or ES causes displacement of piston 19 to the right or left, respectively, thereby causing stretching or return action of movable clamp MC. The fifth solenoid coil AS is connected across L–1, L–2 in a series circuit with limit switch LS–5 and a second set of contacts LS–1B of limit switch LS–1.

In addition to controlling the closing and opening of clamps MC and SC (for the Clamp and Unclamp steps, respectively) and the movement of clamp MC away from and toward clamp SC (for the Stretch and Return steps, respectively) the circuits of Fig. 15 also, by means of relay ARA, automatically control the energization of take-off mechanism TM and coordinate the action of TM with the operational steps and cycles of steps of the stretching apparatus described above. Relay ARA thus functions, together with its associated sets of relay contacts ARA–1 through ARA–4, respectively (Fig. 16), as a transfer relay to alter the energization of slip coupling 129 so that either a decreased or an increased pulling force is applied to strip S by mechanism TM.

Figure 16:
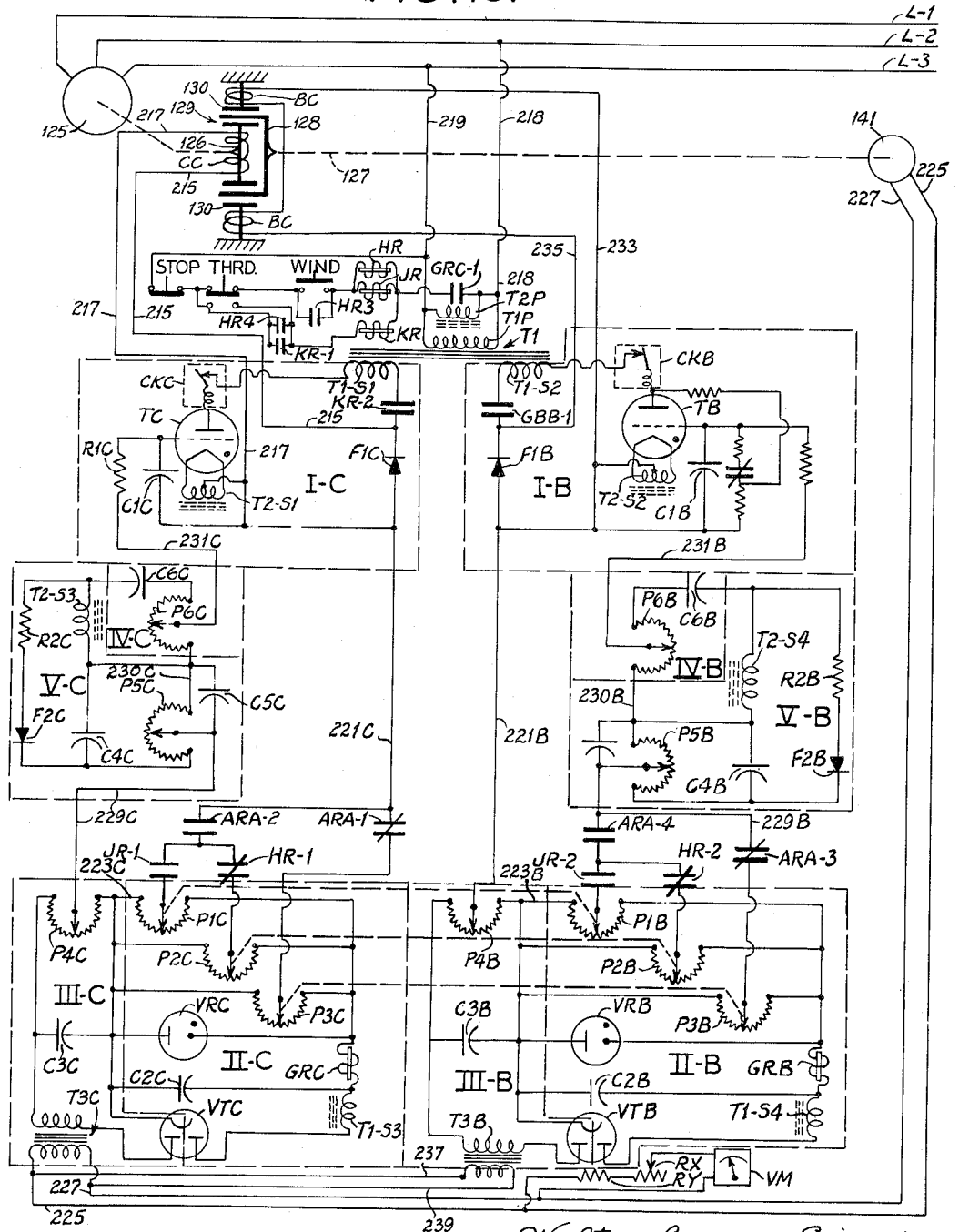

Referring now more particularly to Fig. 16, the slip coupling 129 is shown to include an input member 126 (driven by motor 125), an output member 128 (connected to drive sheave 127) and a braking member 130. An eddy-current clutch field coil CC is adapted when energized to provide a magnetic field which couples members 126 and 128 for torque transfer from the former to the latter. The amount of coupling is a function of the current flow in coil CC. Eddy-current braking of member 129 is accomplished by electrical energization of brake coil BC, the amount of braking being proportional to the current flow through BC. By alternately energizing the brake and clutch coils, the speed of output member 128 is maintained within close limits. Clutch coil CC and brake coil BC are individually energized by separate power rectifier sections I—C and I—B, respectively. Coil CC is connected via wires 215 and 217 in a rectifier circuit including a gas-filled, grid-controlled thyratron rectifier tube TC, a rectifier F1C and a secondary T1—S1 of a power transformer T1. A primary T1–P of transformer T1 is connected through wires 218 and 219 to lines L–2 and L–3 which constitute one phase of a conventional three-phase A. C. power source. Also included in power rectifier section I—C is a manual reset type circuit breaker CKC, a set of contacts KR–2, a grid resistor R1C, a condenser C1C, and a transformer secondary T1—S1.

Section I—C rectifies A. C. power from the A. C. supply lines L–2, L–3 supplied via transformer T1 to thyratron TC to provide D. C. power to coil CC. Because this clutch field coil CC is highly inductive, rectifier F1C (preferably of the selenium type) is provided to supply a directional discharge path to maintain smooth current flow during the nonconductive half-cycles of tube TC. The degree of energization of coil CC depends upon the magnitude of the D. C. voltage supplied to it by the tube TC which in turn is controlled by the voltage difference between the grid and the cathode (represented by the directly heated filament energized by center-tapped transformer secondary T2–S1). When this voltage difference, or grid voltage, is such that the grid of TC is made relatively more positive with respect to its cathode, an increase in clutch coil current results. Correspondingly, when the grid becomes more negative relative to the cathode, then conduction through tube TC and, therefore, current through CC decrease.

The grid voltage which controls the conduction of tube TC is a composite of the voltages of a reference voltage source section II—C and a speed-responsive generator rectifier section III—C. The reference voltage source II—C includes transformer secondary T1—S3 which supplies A. C. to a half-wave rectifier circuit, including one anode and the cathode of a rectifier tube VTC, a filter condenser C2C and voltage regulator tube VRC. Section II—C also includes three potentiometers P1C, P2C and P3C and a relay GRC. A set of contacts GRC–1 of relay GRC is connected in a network with the start and stop circuit components connected in parallel with the transformer primaries T1–P and T2–P and, as will appear, functions to prevent the application of anode voltage to thyratron TC before its filament has been allowed to warm up. The switch contacts ARA–1 and ARA–2, together with sets of contacts JR–1 and HR–1, function to select which one of the three potentiometers P1C, P2C or P3C is connected to section I—C via a wire 221C. A wire 223C connects section II—C to the speed responsive generator source III—C. This section consists of a transformer T3C the primary of which is connected by leads 225 and 227 to speed-control generator 141. The secondary of transformer T3C is connected in series with the other anode of VTC and its cathode in a half-wave rectifier circuit including a filter condenser C3C and a speed-setting potentiometer P4C. The D. C. reference voltage produced by section II—C is connected in opposition to that variable D. C. speed responsive voltage produced by section III—C to provide a composite D. C. grid voltage for thyratron TC. The circuit from the cathode of TC to its grid includes wire 221C, reference voltage source section II—C, wire 223C, speed-responsive generator voltage section III—C, a wire 229C, a grid bias section V—C, a rider wave section IV—C and a wire 231C.

Section V—C includes a transformer secondary T2—S3, a rectifier F2C, a pair of condensers C4C and C5C, a resistor R2C and a potentiometer P5C connected in a half-wave rectifier circuit to provide a D. C. potential between the rotor of potentiometer P5C and a wire 230C interconnecting sections IV—C and V—C. Section V—C serves as a source of D. C. and is inserted in the grid-cathode circuit of TC to adjust the initial operating point of this thyratron tube. The purpose of potentiometer P5C is to adjust the initial or low-speed operating point of the eddy-current clutch controlled by CC.

A condenser C6C and a potentiometer P6C, connected in a loop circuit with transformer winding T2—S3 comprise phase shift section IV—C which functions to superimpose an A. C. rider wave on the D. C. grid control voltage supplied by sections II—C, III—C and V—C to the thyratron TC. Potentiometer P6C serves to adjust the amplitude of this rider wave and thereby functions as a sensitivity control.

The above constitutes the various circuit sections which control the energization of clutch field coil CC. The energization of brake coil BC is similarly controlled by sections I—B through V—B which generally correspond to sections I—C through V—C. Reference characters corresponding to those employed in describing the clutch control sections have been used to indicate corresponding components in the brake control sections, except that the characters are followed by a "B" instead of a "C" to designate brake instead of clutch and the control relay and transformer secondaries are designated in accordance with conventional self-explanatory symbols. A pair of wires 233 and 235 interconnects brake coil BC to section I—B and leads 237 and 239 interconnect transformer T3B with generator 141. This generator supplies a voltage responsive to the rotational speed of sheave 127 as a control signal voltage to sections III—C and III—B. A meter VM, an adjustable resistor RX, and a fixed resistor RY are connected across generator 141. Meter VM indicates the output voltage of generator 141 and is preferably calibrated in terms of rotational speed of sheave 127 or in terms of linear speed of strip S.

The rotors of potentiometers P1C and P1B are mechanically linked, as noted schematically by the dashed line interconnecting them. Potentiometers P2C and P2B, and potentiometers P3C and P3B are similarly ganged in tandem. Thus, the setting of rotors of P1C, P2C and P3C to three different positions, respectively, sets the coupling between members 127 and 128 (and thus the speed of sheave 127) to any one of three preselected values, depending on which set of potentiometers is actually connected to sections III—C and III—B. Potentiometers P1B and P1C are preset to provide a high degree of coupling and, therefore, an increased pulling force to strip S by take-off mechanism TM. The preselected speed or coupling condition, determined by this pair of potentiometers, is known as Wind and will energize take-off mechanism TM rapidly to withdraw stretched strip from between clamps MC and SC. Potentiometers P2B and P2C are preset to provide a lesser degree of coupling and are adjusted to control take-off mechanism TM to apply sufficient pulling force to strip S so that it may be conveniently threaded. The speed or coupling condition of mechanism TM preset by potentiometers P2C and P2B is designated as Thread. Potentiometers P3B and P3C are preset to provide a very low degree of coupling and, therefore, a decreased pulling force to strip S. The preselected speed or coupling condition determined by this pair of potentiometers is known as Stall. When take-off mechanism TM is energized in Stall, it applies only sufficient force to maintain the portion of the stretched strip S between clamp MC and mechanism TM free of slack.

The purpose of potentiometer P5C, as stated above, is to adjust the initial or low-speed operating point of the eddy-current clutch. P5B functions in a somewhat analogous manner and provides an adjustable separation bias which serves to determine the change-over point for alternative brake and clutch operation.

The selection of any one set of speed-setting potentiometers P1C, P1B (Wind); P2C, P2B (Thread); and P3C, P3B (Stall) is determined by the electrical condition of sets of contacts ARA–1 through ARA–4, sets of contacts JR–1 and JR–2, and sets of contacts HR–1 and HR–2. The Stall set of potentiometers P3C and P3B are connected into the circuit of the brake and clutch coil reference voltage source sections II—B and II—C any time contacts ARA–1 and ARA–3 are closed.

These two sets of contacts are normally closed, i. e., they are only opened when associated relay ARA (Fig. 15) is energized. As shown in Fig. 15, relay ARA is energized only when switch LS–3 is closed (after the jaws of clamps MC and SC have opened during the Unclamp and Return steps). During this period of time when ARA is energized, then contacts AR–2 and AR–4 are closed, thus connecting the Wind or Thread sets of potentiometers (P1C, P1B or P2C, P2B, respectively) into the control circuits of Fig. 16. Whether the Wind or Thread potentiometers will be connected depends on whether contacts JR–1 and JR–2 are closed or whether contacts HR–1 and HR–2 are closed. The actuation of these four sets of relay contacts is responsive to the energization of relays JR and HR which are connected in a shunt circuit connected in parallel with transformer primaries T1P and T2P and across power supply lines 218 and 219. This circuit includes a normally closed push button Stop switch, a double throw push button Thread switch, a normally open push button Wind switch, and a pair of contacts GRC–1. Two sets of contacts HR–3 and HR–4 of relay HR are connected in holding circuits across the Wind and Thread switches, respectively. Another relay KR is connected in series with one set of its contacts KR–1 in a circuit shunted across Thread and Wind switches and the coils of relays HR and JR.

From the above described arrangement of components, it will be seen that relays HR and JR are energized as soon as contacts GRC–1 close (which occurs after VTC has warmed up sufficiently to allow passage of current through the coil of relay GRC and thereby to energize it). Energization of relays HR and JR connects potentiometers P1C and P1B to contacts ARA–2 and ARA–4, respectively, unless the Stop or Thread push button switches are pressed. Thus, unless either of these latter two switches is depressed, the actuation of contacts ARA–1 through ARA–4 alternately energizes the take-off mechanism TM between Wind and Stall conditions in response to energization of relay ARA.

*Operation*

The structural association of the various mechanical, pneumatic, hydraulic and electrical components and a brief description of their respective functions have been set forth above. The following is directed to the overall operation of the strip stretching apparatus of the present invention comprising these various components and assemblies of components, and the coordination of various functions.

The stretching apparatus is prepared for operation by mounting a coil 113 of metal strip material S on arbor 115 and threading it over roller 112, through stationary clamp SC and movable clamp MC to the take-off mechanism TM. Assuming that the strip material S is not to be coiled after stretching, but is to be sent along path P (Fig. 2) to a succeeding process (such as shearing, slitting or the like), then strip S is threaded between rolls 119 and 121 which are adjusted from 147 to close on material S for a frictional grip. Strip S may be moved at threading speed to the right (Figs. 1, 2 and 6) by closing mechanical clutch 153 and manually depressing the Thread switch (Fig. 16). Brake 117 provides the necessary frictional drag to prevent overrunning of coil 113. Once the strip S is positioned as desired between clamps SC and MC, the stretching apparatus is prepared for the first step of a cycle of operation.

The first or Clamp step of a first operational cycle, whether the apparatus of the present invention is operated manually (step by step) or automatically (cycle by cycle, or continuously) is initiated by an operator manually depressing push button PB–3 (Clamp). This action completes an A. C. circuit between L–1 and L–2 (Fig. 15) thus energizing the coil of relay AR and thereby closing the contacts AR–1 and AR–2. The closure of contacts AR–1 completes the holding circuit around push button switch PB–3 so that, when it is released, the coil of relay AR remains energized. Closing of contacts AR–2 initiates energization of the time-delay relay TR which, after a predetermined period of time, energizes contacts TR–1 and TR–2 to a closed position. The closure of these contacts in turn completes a circuit between L–1 and L–2 through the clamp solenoid BS. The energization of this solenoid operates pneumatic valve 82 to apply air pressure through line 88 to pistons 81 and 81′, thus causing the jaws of clamps MC and SC to grip a portion of strip S. The circuit to relay ARA at this time is not completed because of the opening of switch LS–3 as the clamp jaws are closed. Also, normally closed contacts AR–3 are open. This deenergized condition of the coil of relay ARA maintains contacts ARA–1 and ARA–3 closed so that during the Clamp step the take-off mechanism TM is energized to Stall condition and only a very slight amount of torque is applied to the strip S by TM.

To begin the second or Stretch step of operation, under manual conditions (switch SW–1 being positioned as shown in Fig. 15), switch PB–4 (Stretch) is depressed manually by the operator. An electrical circuit to the coil of relay BR will be completed provided that contacts LS–1A are closed. If switch SW–1 is positioned to Automatic (Fig. 15), the coil of relay ER is energized, thus closing contacts ER–1. Manual operation of Stretch switch PB–4 is, therefore, not necessary in Automatic as the Stretch step is automatically initiated by the closure of LS–1A. As noted above, these contacts are closed only upon sufficient air pressure being present in line 88 to insure adequate clamping pressure of the jaws of clamps MC and SC. Contacts LS–1A therefore serve as an interlock to prevent movement of clamp MC until the jaws of clamps SC and MC are fully closed on strip S.

Upon energization of the coil of relay BR, a holding circuit around the Stretch switch PB–4 is completed by the closure of contacts BR–1. The simultaneous closure of contacts BR–1 and BR–2 completes an electrical circuit interconnecting solenoid coil CS with power source L–1, L–2. Solenoid coil CS when energized positions hydraulic valve 184 so that hydraulic fluid under pressure is applied to piston 19, so as to move clamp MC to the right (Figs. 1 and 2). At the beginning of this Stretch step, the movement of clamp MC away from the clamp SC acts merely to remove any slack from the reach of strip material S between clamps SC and MC. As soon as the slack is removed from this length of strip S the reaction of the now taut strip S against hydraulic piston 19 increases the hydraulic pressure in line 203, thereby causing LS–5 to close. This action completes an electrical circuit to the coil of clamp solenoid AS (contacts LS–1B being closed as long as the pneumatic pressure is maintained in air line 88). The energization of coil AS actuates armature 179 (Figs. 9–12) to engage the toothed stop 177 with teeth 175.

As explained previously, the cessation of relative movement between integrating bar 165 and bed 1 initiates the actual stretching of strip S beyond its elastic limit. It can be seen, therefore, that a reach of material S between clamps SC and MC can be stretched a predetermined amount regardless of the amount of variation in slack in successive reaches of material during successive cycles of operation.

Clamp MC will continue to move away from clamp SC and to stretch strip S until the arm of limit switch LS–2 is actuated by striking trip member 169. The actuation of switch LS–2 opens contacts LS–2A and closes contacts LS–2B. The former action opens the circuit to the coils of relays AR and BR, thus deenergizing solenoid coils BS and CS. The jaws of clamps MC and SC will, however, remain closed even though BS is deenergized because of the self-maintaining feature of pneumatic valve 82. The deenergization of the latter solenoid coil conditions hydraulic valve 184 so that no hydraulic pressure is applied to either side of piston 19 and actuation of clamp MC by hydraulic cylinder 17 is thereby discontinued. The deenergization of solenoid coil CS also results in a drop of hydraulic pressure in line 203 below that needed to maintain switch LS–5 closed. This deenergizes clamp solenoid coil AS and releases integrating bar 165 so that it returns to its Fig. 11 position.

To initiate the third step, Unclamp, in this cycle of operation, the coil of relay CR must be energized. The circuit to this coil is completed in manual operation by depressing switch PB–2A which in turn causes the closure of contacts CR–3 and completes a holding circuit (LS–4 and CR–3). In Automatic operation the closing of switch LS–2B completes a shunt path (via closed contacts ER–3) around Unclamp switch PB–2A. The closing of contacts CR–1 and CR–2 by automatic or manual energization of coil of relay CR completes the circuit to the coil of pneumatic solenoid DS. The energization of this solenoid coil reverses the pneumatic connections through valve 82 (Fig. 14) and causes the jaws of clamps MC and SC to be reopened.

In order to initiate manually the last or Return step, switch PB–4 must be manually depressed. This completes the circuit to the coil of relay DR, provided that contacts BR–3 are closed. As these contacts are closed, except when relay BR is energized, they serve as an interlock arrangement preventing a return movement of the jaw of clamp MC as long as the coil of relay BR (which controls the closure of the clamp jaws) is energized. Another interlock arrangement is provided by switch LS–3 which must be closed before the Return relay DR can be energized. LS–3 will be closed only when the jaws of clamps MC and SC are sufficiently open so as to allow free movement of the strip S therethrough. In Automatic operation the Return step is initiated by the closure of switch LS–3.

Energization of the coil of relay DR closes contacts DR–1 and DR–2, thereby completing the electrical circuit to the coil of hydraulic solenoid ES. This reverses the position of hydraulic valve 184 and applies hydraulic fluid under pressure in the direction of the dashed arrow through line 201 to retract clamp MC toward its initial position. The return movement of carriage 7 toward its initial position continues until the extension 162 (Fig. 12) strikes the arm of limit switch LS–4 and actuates the contacts thereof to an open position. The opening of switch LS–4 breaks the circuit to coil of relay DR and thereby deenergizes the solenoid coil ES. This action in turn permits the hydraulic fluid to freely circulate to the sump 185 without applying hydraulic pressure to either side of the piston 19. This concludes the last step in one cycle of stretcher operation.

During the first three (Clamp, Stretch and Unclamp) of the above four steps of operation, it will be noted that contacts ARA–1 and ARA–3 remain closed and that the Stall potentiometers P3C and P3B were connected in the circuits of Fig. 16. These control circuits operate to maintain a very low level of coupling between the motor 125 and sheave 127. This small amount of torque which is applied to the portion of strip S between roll 121 is sufficient to maintain it free of slack during the cycle.

As soon as jaws of clamps MC and SC have opened sufficiently wide to actuate switch LS–3 to a closed position, the coil of relay ARA is energized (contacts AR–3 being closed upon initiation of the Unclamp step). This opens contacts ARA–1 and ARA–3 and closes contacts ARA–2 and ARA–4, thereby immediately switching take-off mechanism TM into Wind condition. This action occurs simultaneously with the movement of clamp MC to the left (Figs. 1 and 2) and during the Return step. An increased torque is applied via coupling 129 from motor 125 to sheave 127. This increased coupling acts to remove the stretched strip S from between the clamps MC and SC at a high rate of speed. However, this rate of speed is closely controlled to the value preset by Run potentiometers P1C and P1B. Assuming these potentiometers are set to remove strip at a linear speed of approximately 400′ per minute, an A. C. voltage proportional to the linear speed is produced by speed-responsive generator 141. The rectified D. C. voltage (sections III—C and III—B) thus produced is connected, as described above, in bucking opposition to the D. C. reference voltage potentials of sections II—C and II—B (set by potentiometers P1C and P1B) and this composite voltage controls the energization of the clutch and brake coils CC and BC to maintain this linear speed constant. The strip S is therefore driven at a fixed speed, because if the linear speed of material S tends to increase beyond the preset value, brake coil BC is immediately energized to retard this acceleration; while a decrease in speed below the preset value will be offset by increased energization of clutch coil CC. Thus coils CC and BC are alternately energized to closely control the linear speed of strip S by means of the voltage developed by generator 141. Also, because of this action, a change of operation of mechanism TM from Stall to Run is accomplished almost instantaneously, the speed being rapidly increased by maximum energization of coil CC until the speed is increased to the desired level. Similarly, the change in operating conditions of mechanism TM from Run to Stall is also substantially instantaneous because maximum energization of coil BC quickly decreases the linear speed to the lower preset level.

In manual operation, the strip S will continue to be removed rapidly by TM from between the clamps MC and SC until the operator depresses Clamp bush button PB–3. As soon as this is done, the coil of relay ARA is deenergized and take-off mechanism TM is returned to Stall operation. The jaws of clamps MC and SC are actuated to close as soon as the requisite time delay (relay TR) has passed.

If switch SW–1 is in the Automatic position, the coil of relay FR will be energized as soon as the intermittently actuated monitoring switch device LS–6 is closed. The contacts of this switch are automatically (but only momentarily) closed each time this device registers the removal of one reach of material S from between the jaws of clamps MC and SC. Energization of the coil of relay FR closes contacts FR–1 (shunt-connected with the manual push button Clamp switch PB–3) which initiates a second cycle of operational steps beginning with Clamp.

In the event that it is desired to coil the stretched material S on mandrel 157 (either in single or tandem strip form) so as to form a coil 156, mechanical clutch 153 is opened, but the rolls 119 and 121 are left in gripping adjustment with respect to the issuing material. The end of strip S is attached to mandrel 157 which is driven by motor 125 via 129, 127, 131 and 133. Thus, the coil 156 is driven and the material is drawn through the rolls 119 and 121 which in turn drive the speed responsive control generator 141.

In this arrangement, therefore, pulling force is applied to strip S along path Q by mandrel 157, or, in effect, the coil 156. In the previously described arrangement wherein the strip S is sent without coiling to a subsequent process via path P, pulling force is applied to strip S by rolls 119 and 121, the latter of which is directly driven through clutch 153 from coupling 129. In either case generator 141 is driven in response to the linear speed of material S and thereby supplies a control voltage to the circuits of Fig. 16.

Sometimes it is desirable to coil extremely thin material. Such material may be either in single or multiple strip form. However, such light material should not be called upon, in being coiled, to drive the rolls. In order to coil such thin material and still provide a signal from generator 141 to control mechanism TM, mechanical clutch 153 is again closed but the rolls 121, 119 are separated by raising the upper roll 119 through the elevator mechanism 147. Generator 141 thereby provides a control signal responsive to the speed of coiling.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Strip stretching apparatus comprising a bed having an input section and an output section, said input section including a first openable clamp fixed in position on said bed, said output section including a second openable clamp movable toward and away from the first clamp for gripping and stretching and releasing operations on strip material extending through the clamps, a strip feeding mechanism including means for supplying strip material to said apparatus, said mechanism being located adjacent the input section, and a take-off mechanism adjacent the output section, said take-off mechanism comprising roll means adapted to pull strip material from the movable clamp, variable-torque slip coupling means adapted to drive said roll means, and a motor driving said slip coupling means.

2. Apparatus made according to claim 1, including means adapted to control said torque in response to movements of said second clamp to apply a decreased pulling force to the strip when the clamps are closed and an increased pulling force to it when they are open, whereby slack formed in the portion of the strip between said movable clamp and said take-off mechanism is taken up at low tension and rapid acceleration and movement of the strip through the apparatus are effected thereafter.

3. A strip stretching apparatus comprising an elongate bed having a first openable clamp fixed at one end of the bed and a second openable clamp at the other end of the bed movable toward and away from the first clamp for gripping and stretching and releasing operations on strip material extending through the clamps, a strip feeding mechanism adjacent said first clamp and having a coil support and a brake therefor, and a take-off mechanism adjacent said second clamp; said take-off mechanism comprising rotary rolls, a rotary mandrel beyond said rolls for coiling material passing through the rolls from the stretching apparatus, a motor, a variable slip coupling having an input member driven by said motor and an output mandrel adapted to drive said mandrel, and means adapted to effect a driving connection between said output member and said rolls.

4. Apparatus made according to claim 3, including means for opening and closing said driving connection.

5. Apparatus made according to claim 4, including means for changing the distance between said rolls, whereby when said rolls are closed on the strip material and said driving connection is closed the rolls act as pinch rolls to draw strip material from the stretching apparatus and pass it on to a subsequent process, and whereby when said rolls are closed and said driving connection is open said strip material is wound on said mandrel.

6. Strip stretching apparatus comprising an elongate bed having an input section and an output section, said input section including a first openable clamp fixed in position on said bed, said output section including a second openable clamp movable toward and away from the first clamp for gripping and stretching and releasing operations on strip material extending through the clamps, a strip-coil support located adjacent the input section, a variable-torque continuous drive take-off mechanism located adjacent the output section, means adapted to reduce torque and close said clamps, means responsive to clamp closure adapted to move the movable clamp along the bed and away from the fixed clamp and thereby stretch the portion of strip material between said clamps, means responsive to a predetermined amount of stretching of said strip material adapted to open the clamps, and means responsive to clamp opening adapted to increase the torque of said drive means to accelerate movement of the stretched strip from the apparatus.

7. Strip stretching apparatus comprising an elongate bed having an input section and an output section, said input section including a first openable clamp fixed in position on said bed input section, said output section including a second openable clamp movable toward and away from the first clamp for gripping and stretching and releasing operations on strip material extending through the clamps, a strip-coil support and resistance device located adjacent the input section, a variable-torque continuous drive take-off mechanism located adjacent the output section, means responsive to predetermined strip movement adapted to reduce said torque and close said clamps, means responsive to clamp closure adapted to move the second clamp away from the first clamp and thereby stretch the portion of strip material between said clamps, means responsive to a predetermined amount of stretching of said strip material adapted to open the clamps, means responsive to a predetermined amount of clamp opening movement to increase the torque of said drive means to accelerate movement of said stretched strip from the apparatus and to return the second clamp to its initial position.

8. Strip stretching apparatus comprising a bed having an input section and an output section, said input section including a first openable clamp fixed in position on said bed, said output section including a second openable clamp movable toward and away from the first clamp for gripping and stretching and releasing operations on strip material extending through the clamps, a strip-coil support located adjacent the input section, a take-off mechanism located adjacent the output section and adapted to apply alternately a decreased pulling force to the strip and then an increased pulling force to the strip, a first switch adapted when actuated to energize the take-off mechanism so as to apply said reduced pulling force to the strip and to energize said clamps to grip the strip, a second switch responsive to closure of said clamps to initiate movement of the movable clamp away from the fixed clamp and thereby stretch the portion of strip material between said clamps, a third switch responsive to a predetermined amount of stretching of said strip material to cause reopening of said clamps, a fourth switch responsive to a predetermined amount of clamp opening movement to initiate return movement of the movable clamp toward the fixed clamp and to energize the take-off mechanism so as to apply said increased pulling force to the strip thereby to accelerate movement of the stretched strip from the apparatus, and a fifth switch responsive to the return of the movable clamp to its initial position to discontinue return movement of said movable clamp, and a sixth switch responsive to a predetermined amount of linear travel of said strip through the clamps to reenergize the clamps to grip the strip and to reenergize the take-off mechanism so as to apply said reduced pulling force to the strip thereby automatically to start a second cycle of operation.

9. Strip stretching apparatus comprising a bed having an input section and an output section, said input section including a first openable clamp fixed in position on said bed, said output section including a second openable clamp movable toward and away from the first clamp for gripping and stretching and releasing operations on strip material extending through the clamps, a strip-coil support located adjacent the input section, a take-off mechanism located adjacent the output section and adapted to apply alternately a decreased pulling force to the strip and then an increased pulling force to the strip, a first switch adapted when actuated to energize the take-off mechanism so as to apply said reduced pulling force to the strip and to energize said clamps to grip the strip, a second switch responsive to closure of said clamps to initiate movement of the movable clamp away from the fixed clamp and thereby remove slack from the portion of strip material between said clamps, stretch measuring means responsive to a predetermined amount of tension in said portion of strip material to determine the amount the strip portion is to be stretched, a third switch responsive to a predetermined amount of stretching of said strip material to cause reopening of said clamps, a fourth switch responsive to a predetermined amount of clamp opening movement to initiate return movement of the movable clamp toward the fixed clamp and to energize the take-off mechanism so as to apply said increased pulling force to the strip thereby to accelerate movement of the stretched strip from the apparatus, a fifth switch responsive to the return of the movable clamp to its initial position to discontinue return movement of said movable clamp, and a sixth switch responsive to a predetermined amount of linear travel of said strip through the clamps to reenergize the clamps to grip the strip and to reenergize the take-off mechanism so as to apply said reduced pulling force to the strip thereby automatically to start a second cycle of operation.

10. In strip stretching apparatus including a clamp, said clamp comprising a laterally compensating jaw below the strip and a vertically movable jaw above the strip, said jaws having a first pair of flat strip-engaging surfaces, means pivoting the movable jaw on an axis transverse to a length of strip in position between the jaws, a wedge supporting the compensating jaw at a second pair of engaging surfaces, said second pair of engaging surfaces being of forms which slope in the direction of the strip and which are curved laterally thereto, means guiding the wedge in a direction parallel to the strip movement, and means for adjusting the position of said wedge for determining the vertical position of the compensating jaw while allowing lateral compensatory movements relative to the movable jaw.

11. Apparatus made according to claim 10, wherein said engaging surfaces are determined by straight-line sloping generators which lie parallel to one another and slope in the general direction of the strip length.

References Cited in the file of this patent

UNITED STATES PATENTS

| | | |
|---|---|---|
| 1,776,775 | Biggert | Sept. 30, 1930 |
| 2,378,413 | Lermont | June 19, 1945 |
| 2,380,277 | Weightman | July 10, 1945 |
| 2,381,657 | Eksergian | Aug. 7, 1945 |
| 2,397,029 | McLaughlin | Mar. 19, 1946 |
| 2,432,828 | Stone | Dec. 16, 1947 |
| 2,479,353 | Hansell | Aug. 16, 1949 |
| 2,613,718 | Vaughn | Oct. 14, 1952 |

FOREIGN PATENTS

| | | |
|---|---|---|
| 243,516 | Great Britain | Dec. 3, 1925 |
| 168,501 | Switzerland | July 2, 1934 |
| 571,651 | Great Britain | Sept. 3, 1945 |